(12) United States Patent
White et al.

(10) Patent No.: US 7,709,139 B2
(45) Date of Patent: May 4, 2010

(54) THREE DIMENSIONAL BATTERY

(75) Inventors: Kevin White, Hudson, MA (US); Quinn Horn, Cambridge, MA (US); Edward Salley, Andover, MA (US); John Lennhoff, Andover, MA (US)

(73) Assignee: Physical Sciences, Inc., Andover, MA (US)

( * ) Notice: Subject to any disclaimer, the term of this patent is extended or adjusted under 35 U.S.C. 154(b) by 574 days.

(21) Appl. No.: 11/656,329

(22) Filed: Jan. 22, 2007

(65) Prior Publication Data
US 2008/0176139 A1 Jul. 24, 2008

(51) Int. Cl.
*H01M 4/04* (2006.01)
*H01M 4/64* (2006.01)
*H01M 10/00* (2006.01)

(52) U.S. Cl. .................. 429/127; 429/209; 429/236; 429/314; 29/623.5; 977/948

(58) Field of Classification Search .............. 429/127, 429/209, 235, 236, 314, 623.5; 29/623.5; 977/948
See application file for complete search history.

(56) References Cited

U.S. PATENT DOCUMENTS

| 1,975,504 | A |   | 10/1934 | Formhals |   |
|---|---|---|---|---|---|
| 4,522,897 | A | * | 6/1985 | Walsh | 429/127 X |
| 4,738,757 | A | * | 4/1988 | Naarmann | 205/152 |
| 5,242,768 | A | * | 9/1993 | Nagatsuka et al. | 429/127 |
| 5,821,012 | A | * | 10/1998 | McCullough | 429/209 |
| 6,562,511 | B2 |   | 5/2003 | Daroux et al. |   |
| 6,605,390 | B1 |   | 8/2003 | Moore et al. |   |
| 6,881,515 | B2 |   | 4/2005 | Wensley |   |
| 6,979,513 | B2 |   | 12/2005 | Kelley et al. |   |
| 7,341,806 | B2 |   | 3/2008 | Kelley et al. |   |
| 2004/0241550 | A1 |   | 12/2004 | Wensley et al. |   |
| 2005/0053840 | A1 |   | 3/2005 | Jo et al. |   |
| 2005/0255233 | A1 |   | 11/2005 | Madou et al. |   |
| 2005/0272214 | A1 |   | 12/2005 | Chiang et al. |   |
| 2005/0287042 | A1 |   | 12/2005 | Chase et al. |   |
| 2008/0118832 | A1 |   | 5/2008 | Artman |   |
| 2008/0274403 | A1 | * | 11/2008 | Kim et al. | 429/209 |

FOREIGN PATENT DOCUMENTS

WO   WO 2005/020350 A1   3/2005

(Continued)

OTHER PUBLICATIONS

Horn, Quinn C. et al., "Three-Dimensional Lithium-Ion Batteries Based on Non-Woven Carbon Fabrics", 2003, Abs. 1280, 204th Meeting, The Electrochemical Society, Inc.

(Continued)

*Primary Examiner*—Stephen J. Kalafut
(74) *Attorney, Agent, or Firm*—Proskauer Rose LLP

(57) ABSTRACT

A battery device includes a cathode current collector and an anode current collector. A fibrous electrode forms a structure defining a plurality of pores. A first portion of the fibrous electrode is in contact with a current collector. An electrolytic polymer is electrodeposited on the fibrous electrode to provide substantial uniform coverage of fibers forming the fibrous electrode. A plurality of electrode particles are disposed within the plurality of pores and separated from the fibrous electrode by the electrolytic polymer.

34 Claims, 17 Drawing Sheets

FOREIGN PATENT DOCUMENTS

| WO | WO 2007/008644 A2 | 1/2007 |
|----|-------------------|--------|
| WO | WO 2008/089110 A1 | 7/2008 |

OTHER PUBLICATIONS

Long, Jeffrey W. et al, "Three-Dimensional Battery Architectures", 2004, Chemical Reviews, vol. 104, No. 10, pp. 4463-4492.

White, Kevin C., et al., "Anode and Cathode Templated Three-dimensional Lithium Ion Batteries Based on Nano-fibrous Electrodes" 2006,, Abs. 1222, 208th ECS Meeting, The Electrochemical Society, Inc.

White, Kevin C., "Three Dimensional Cathode Materials From Electrospinning", 2003, Abs. 1294, 204th Meeting, The Electrochemical Society, Inc.

Che et al, Chemical-Vapor Deposition-Based Template Synthesis of Microtubular TiS2 Battery Electrodes, 1997, pp. 4296-4302, Journal of the Electrochemical Society, vol. 144, No. 12, Dec. 1997.

Serebrennikova et al, Optimization of the Preparation Conditions of Sol-Gel Derived Ni-Co Oxide Films, 2000, pp. 3614-3620, Journal of the Electrochemical Society, vol. 147, No. 10, 2000.

Patrissi et al, Sol-Gel-Based Template Synthesis and Li-Insertion Rate Performance of Nanostructured Vanadium Pentoxide, pp. 3176-3180, Journal of the Electrochemical Society, vol. 146, No. 9, 1999.

Nishizawa et al, Template Synthesis of Polypyrrole-Coated Spinel LiMn2O4 Nanotubules and Their Properties as Cathode Active Materials for Lithium Batteries, pp. 1923-1927, Journal of the Electrochemical Society, vol. 144, No. 6, Jun. 1997.

Kanamura et al, Preparation of Lithium Ionically Conductive Oxide Film by Sol-Gel Method, CSJ Series—Publications of the Ceramic Society of Japan vols. 9 & 10, pp. 285-288, Key Engineering Materials, vols. 228-229, 2002.

\* cited by examiner

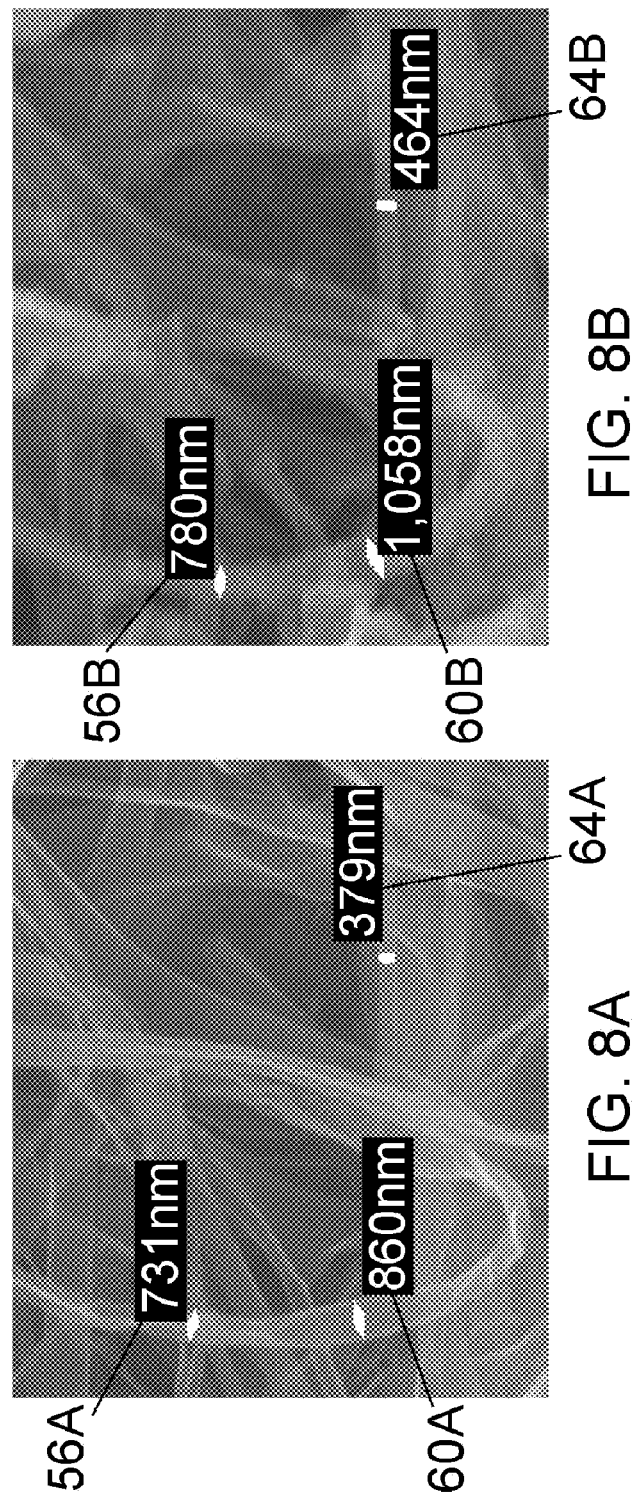

THREE DIMENSIONAL BATTERY

GOVERNMENT RIGHTS

This invention was made with government support under Contract No. N66001-04-C-8025 and Contract No. N00164-03-C-6030, both awarded by the United States Navy. The government may have certain rights in the invention.

FIELD OF THE INVENTION

In general, the invention relates to three-dimensional batteries. In particular, the invention relates to a battery device with interpenetrating, co-continuous electrodes including fibers and/or a plurality of particles that function as an electroactive material.

BACKGROUND OF THE INVENTION

The worldwide demand for portable electronic devices in the past decade have had an enormous impact on the development of portable energy storage devices. Batteries in which lithium ions shuttle between a cathode and an anode have emerged as the power source of choice for the high performance rechargeable battery market. The thick metal plates of traditional batteries have given way to lithium ion cells, which are lighter and more compact. Although the materials in today's batteries differ from those of displaced technologies, the basic two-dimensional character and layer-by-layer construction of the cells remain.

The planar two dimensional construction leads to several drawbacks, for example, in terms of energy storage capacity relative to size. Drawbacks include slow transport of ions, particle agglomeration inside the cell, particle to particle contact resistance, and containment of the particles in a binder that prevents the particles from contributing effectively to electron storage capacity. To address these issues, the thickness of the electrodes can be minimized in conventional two-dimensional devices. However, reduction of the electrode thickness results in a lower fraction of electroactive material in a fixed volume, resulting in a lower cell capacity.

SUMMARY OF THE INVENTION

The invention, in one embodiment, features a three-dimensional battery device. Fibers and/or a plurality of particles can function as the electrode material of the battery device. A techniques for making a battery device is also provided. A battery device can include a high energy storage capacity relative to its size, and can generate relatively high current using stable single cell potentials. A battery device can be used in small scale distributed devices, such as sensors and robotics, which require a burst of power. A battery device can be effectively micro-scaled and is, therefore, applicable to various size constrained applications. A battery device can be used in an autonomous device with an expected run time measured in years.

In one aspect, the invention features a battery device including a cathode current collector, a fibrous cathode, an electrolytic polymer, a plurality of anode particles, and an anode current collector. The cathode and anode current collectors define a first and second surface of the battery, respectively. A first portion of the fibrous cathode is in contact with the cathode current collector. The fibrous cathode forms a structure that defines a plurality of pores. An electrolytic polymer is electrodeposited on the fibrous cathode to provide substantial uniform coverage of fibers forming the fibrous cathode. A plurality of anode particles is disposed within the plurality of pores and is separated from the fibrous cathode by the electrolytic polymer.

In another aspect, the invention features a battery device including an anode current collector, a fibrous anode, an electrolytic polymer, a plurality of cathode particles, and a cathode current collector. The anode and cathode current collectors define a first and second surface of the battery respectively. A first portion of the fibrous anode is in contact with the anode current collector. The fibrous anode forms a structure that defines a plurality of pores. An electrolytic polymer is electrodeposited on the fibrous anode to provide substantial uniform coverage of fibers forming the fibrous anode. A plurality of cathode particles is disposed within the plurality of pores and is separated from the fibrous anode by the electrolytic polymer.

In yet another aspect, the invention features a method of forming a battery structure. An adhesive is applied to a first current collector. Fibers are electrospun onto the adhesive to form a mesh having fused fibers and a plurality of pores. A polymer is electrodeposited onto the mesh to provide a coating on the exterior surface of the fused fibers. Electrode particulates are infiltrated into the plurality of pores. The coating on the exterior surface of the fused fibers prevents direct contact between the electrode particulates and the fused fibers.

In other examples, any of the aspects above can include one or more of the following features. In some embodiments, the fibrous cathode and/or anode can be an electrospun mesh of fibers. The fibers can be ceramic fibers, carbon fibers, and/or $LiNi_{0.7}Co_{0.3}O_2$ fibers. In certain embodiments, one or more of the electrodes can exhibit substantial fiber to fiber contact to provide an electrically unified mesh. The fibers can have a thickness between about 50 nm and about 1,000 nm. The battery can be a lithium based battery.

Anode particles can include carbon nanoparticles. Cathode particles can include ceramic nanoparticles. Sol-gel techniques can be used to form the electrode particles and disperse them within the plurality of pores. The electrolytic polymer can include poly(phenylenediamine). In one embodiment, poly(phenylenediamine) is exposed to a liquid electrolyte solution after electrodeposition. The electrolytic polymer can be coated over the fibers to a thickness of about 5 nm to about 100 nm.

In certain embodiments, a second current collector can be attached opposite the first current collector of the battery structure. Carbon fibers can be electrospun, and the carbon fibers can be pyrolyzed to form the mesh having fused fibers and a plurality of pores. Rigid supports can be positioned above and/or below the carbon fibers during pyrolyzation.

In some embodiments, a polymer can be electrodeposited from solution. The monomer concentration of the solution can be between about 0.1 mM and about 1.0 M. A pulsed voltage can be applied across the mesh. Ceramic fibers can be electrospun. The ceramic fibers can be pyrolyzed to form the mesh having fused fibers and a plurality of pores. Pyrolyzation can be performed at a temperature between about 500° C. and about 2,500° C.

In various embodiments, electrode particulates can be infiltrated into the plurality of pores by applying a solution including the electrode particulates to the mesh. The electrode particulates can include nano-sized particles of electrode material. The infiltration can include applying a solution including constituents to form the electrode particulates to the mesh. The solution can be reacted to form the electrode particulates within the plurality of pores. In some embodiments, the battery structure is immersed into a liquid electrolyte solution.

The details of one or more examples are set forth in the accompanying drawings and description. Further features, aspects, and advantages of the invention will become apparent from the description, the drawings, and the claims.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIGS. 8A-8B show SEM images of cathode fibers before and after electrodeposition of a PPD electrolyte.

DESCRIPTION OF THE INVENTION

Figure 1:
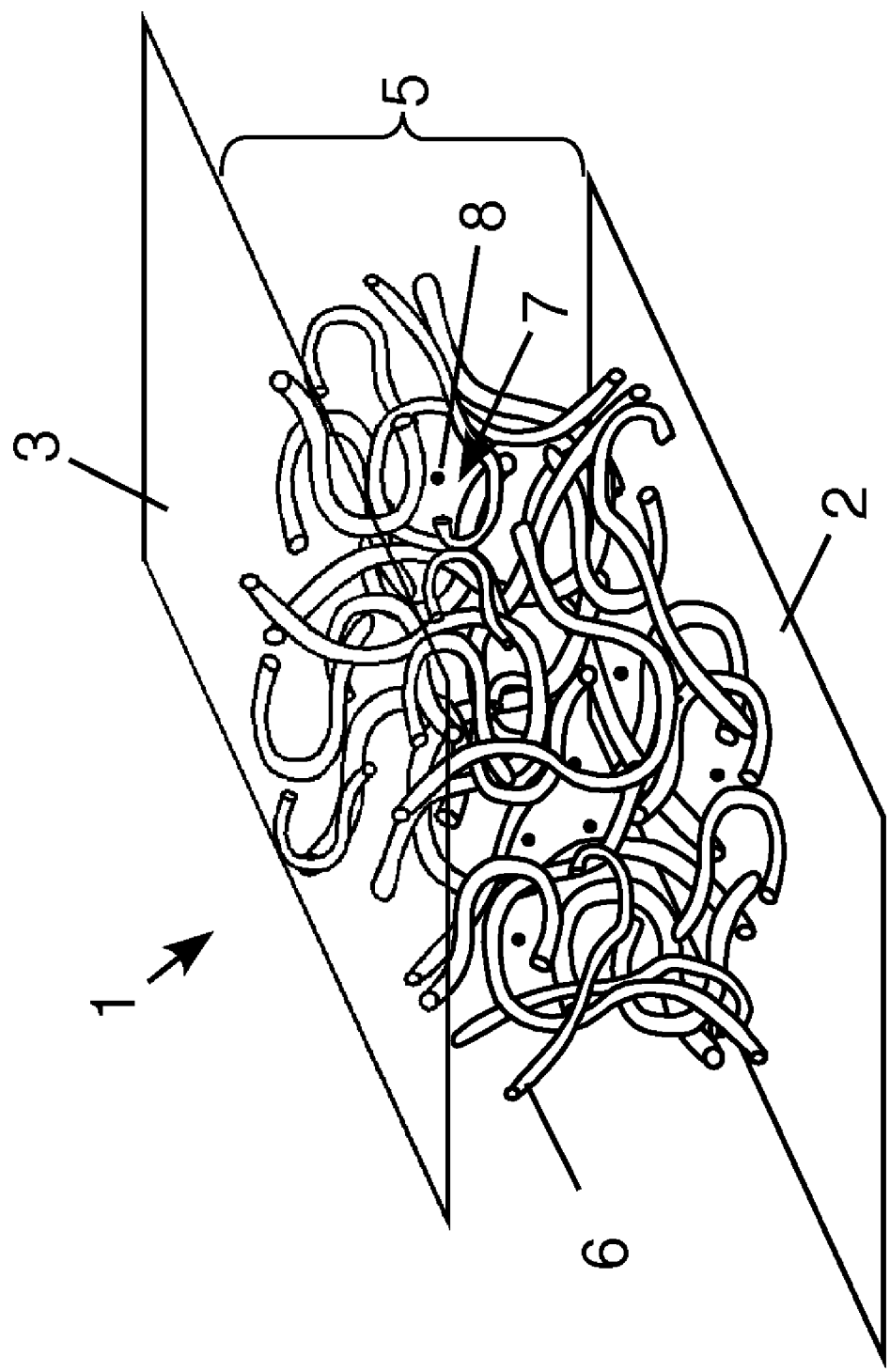
FIG. 1 shows a perspective view of a battery device.

FIG. 1 shows a battery device 1 having a first surface 2 and a second surface 3. A fibrous layer 5 is formed between the two surfaces 2 and 3 of the battery device 1. The fibrous layer 5 includes a plurality of individual fibers 6. The fibrous layer 5 defines a plurality of pores 7. A plurality of particles 8 can be disposed within the pores 7 of the fibrous layer 5.

The two surfaces 2 and 3 can be current collectors of the battery device 1. The fibers 6 and the particles 8 can be electrodes of the battery device 1. The fibers can be electrospun to form a mesh, which can exhibit substantial fiber to fiber contact. In certain embodiments, the first surface 2 can be a cathode current collector and the second surface 3 can be an anode current collector. In some embodiments, the first surface 2 can be an anode current collector and the second surface 3 can be a cathode current collector. In certain embodiments, the fibrous layer 5 can function as a cathode and the plurality of particles 8 can function as the corresponding anode. In certain embodiments, the fibrous layer 5 can function as an anode and the plurality of particles 8 can function as the corresponding cathode.

Figure 2:
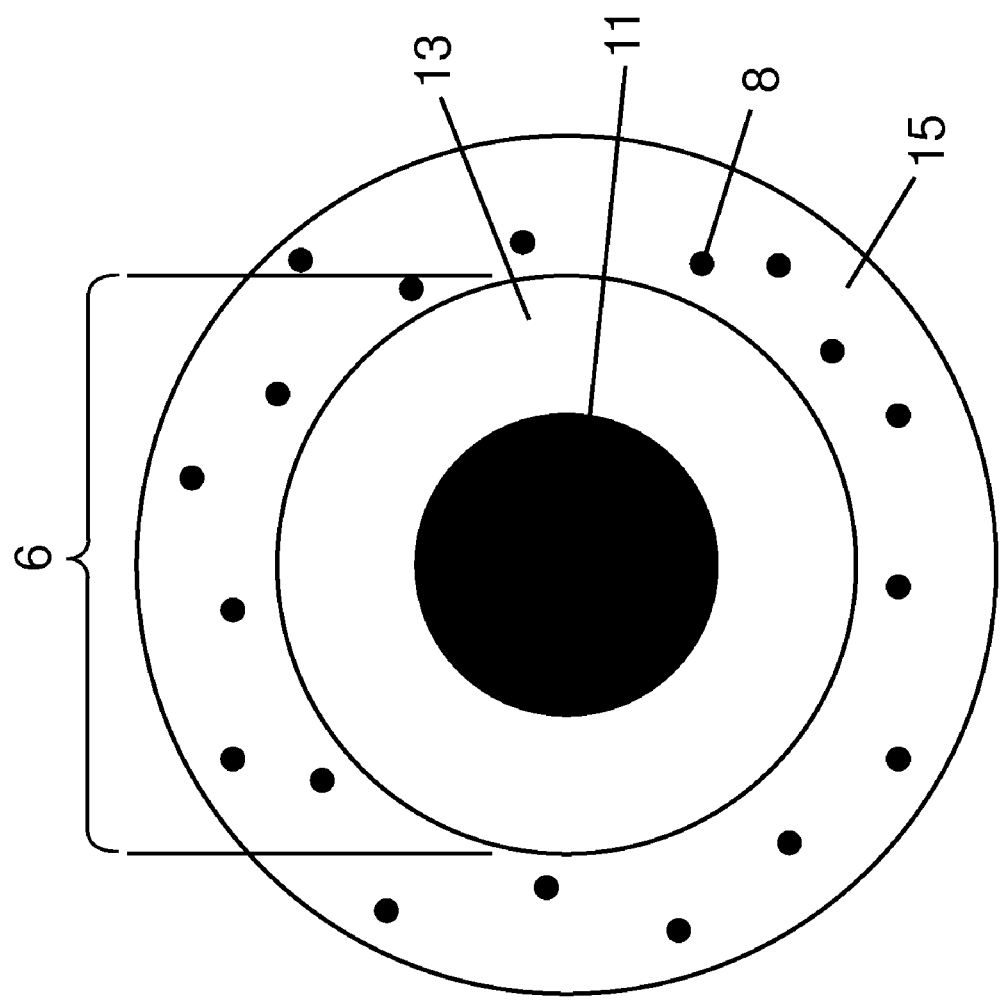
FIG. 2 shows a sectional view of a fiber.

FIG. 2 shows a cross-sectional view of an individual fiber 6. The fiber 6 includes a core 11 that is substantially uniformly coated with an electrolytic polymer 13. Suitable materials for the core 11 include any primary or secondary battery anode or cathode materials. In certain embodiments, the core material includes carbon nanoparticulates. Suitable materials for the electrolytic polymer 13 include lithium-based material and organic polymers. Layer 15 can be substantially evenly coated over the polymer 13. Layer 15 can include a plurality of particles 8. Suitable materials for the plurality of particles 8 include any primary or secondary battery anode or cathode materials. In certain embodiments, the particle material include carbon. In some embodiments, layer 15 can include a solution containing a liquid electrolyte and/or a solvent.

Preparation of a Fibrous Cathode

Electrospinning

Sol-gel chemistry can be combined with electrospinning to form the fibrous layer. To prepare a fibrous layer that can function as the cathode, one or more metal acetates or nitrate salts can be mixed with a solvent to reach a desired concentration in terms of molarity. Suitable metals include, for example, lithium, nickel, and cobalt. A suitable solvent is, but is not limited to, water. To this solution, a polymer binder (e.g., poly(vinyl acetate)) can be added to reach a desired viscosity, resulting in a gel. The gel viscosity can be controlled by controlling the concentration and polymer chain length. Typically viscosity of the solution/gel is in the range of about 500 and about 1200 cP. Table 1 lists exemplary polymers that can be used for this purpose.

TABLE 1

Candidate Water Soluble Polymers Employed in Electrospinning Solutions

| Polymer Component | Low Molecular Weight | High Molecular Weight |
| --- | --- | --- |
| Poly(ethylene oxide) | 100 kD | 600 kD |
| Poly(vinylpyrrolidnone) | 55 kD | 1300 kD |
| Poly(vinylacetate) | 124 kD | 186 kD |

Figure 3:
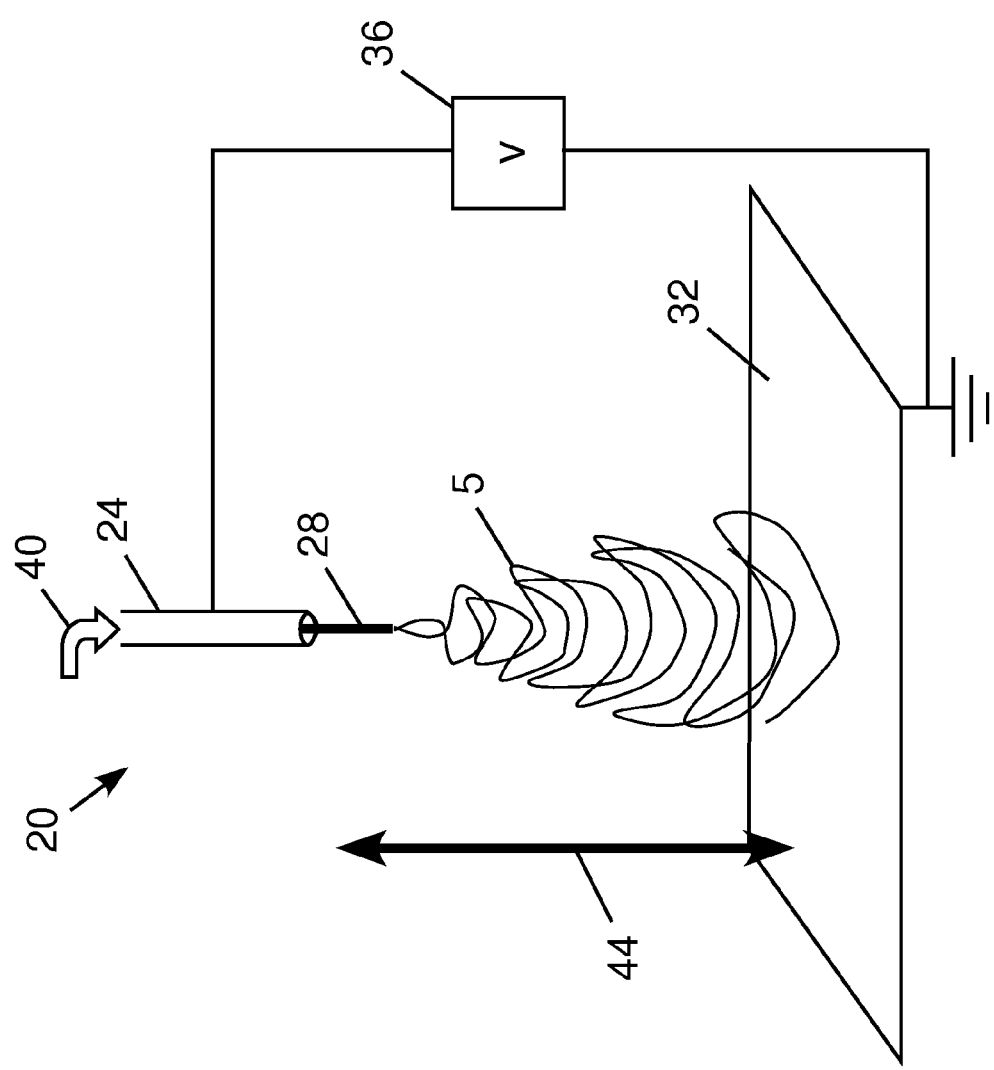
FIG. 3 depicts an apparatus for electrospinning a fiber
Figure 4B:
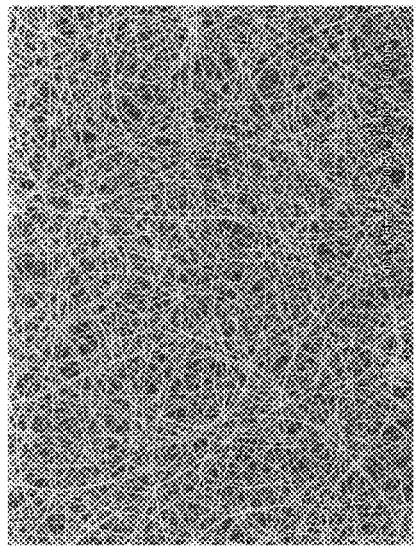
FIGS. 4A-4D show scanning electron micrograph (SEM) images of cathode fibers prior to heat treatment.
Figure 4D:
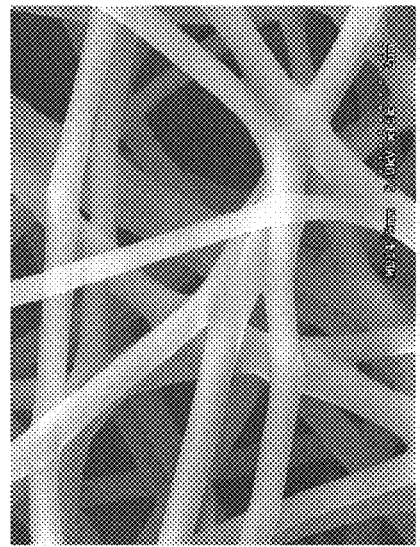
Figure 4A:
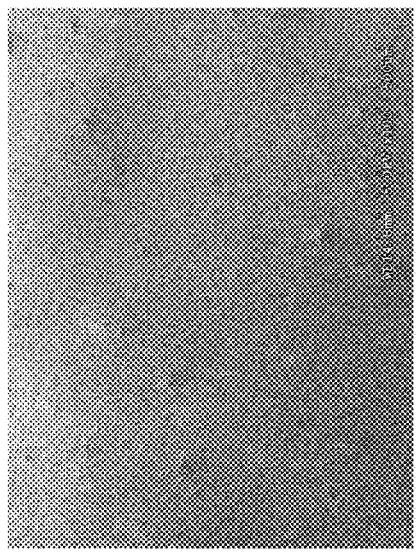
Figure 4C:
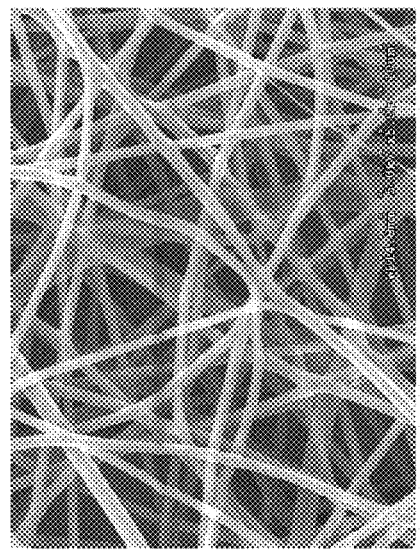

FIG. 3 shows an electrospinning apparatus 20 that can be used to form a fiber layer 5. The electrospinning apparatus 20 includes a syringe pump 24, a solution delivery system 28, a target 32, and a high voltage supply 36. The delivery system 28 can be made of a non-reactive material such as Teflon or stainless steel, and can be a nozzle or a needle. A polymer solution/gel 40 can be added to the syringe pump 24 and injected through the solution delivery system 28. A droplet can be formed on the tip of the delivery system 28, and when electrical current is applied, a mat of fibers can be deposited on the target 32. The target 32 can be placed at a distance 44 from the delivery system 28.

In certain embodiments, a droplet of about 1.25 mm is formed on the tip. The distance 44 can be between about 5 cm and about 20 cm. The electrical current can have a voltage between about 5 kV and about 30 kV. Table 2 shows examples of sol-gel 40 precursor formulations.

TABLE 2

Final Electrospinning Sol-Gel Precursor Formulations

| Compound | Mass in Solution, g | Concentration in Solution | Concentration in Dried Fiber |
|---|---|---|---|
| Lithium Acetate | 0.926 | 14% | 72% |
| Cobalt Acetate | 1.046 | | |
| Nickel Acetate | 2.049 | | |
| poly(vinyl acetate) | 1.8 | 5.60% | 28% |
| Water | 25.7 | 80.40% | 0% |

In certain embodiments, the target 32 is a current collector. For example, when the fibrous layer being formed is a cathode, the target 32 can be a cathode current collector. In certain embodiments, the current collector can be a strip of a suitable metal (e.g., nickel). In one embodiment, the current collector is a 1 cm×3 cm strip of metal. Fibers about 10 nm to about 5 µm can be formed, although thinner or thicker fibers can be formed depending on the application. The thickness of the deposited fibers can be between about 50 nm and about nm-1000 nanometers, although thinner or thicker fiber meshes can be formed depending on the application. The fibers can exhibit a substantial amount of fiber to fiber contact resulting in a unified mesh. A plurality of pores can be generated as a result of the unified mesh. FIGS. 4A-4D show scanning electron micrograph (SEM) images of a fibrous cathode prior to being heat treated (4A—100 times magnification, 4B—500 times magnification, 4C—5,000 times magnification, and 4D—15,000 times magnification).

Heat Treatment

Figure 5B:
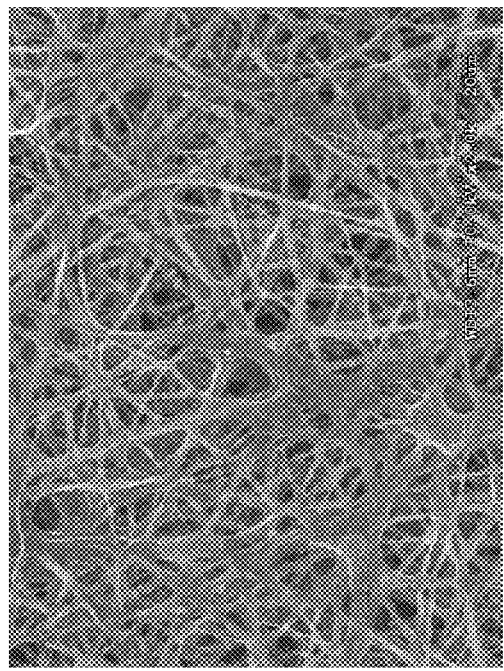
FIGS. 5A-5B show SEM images of cathode fibers after heat treatment.
Figure 5A:
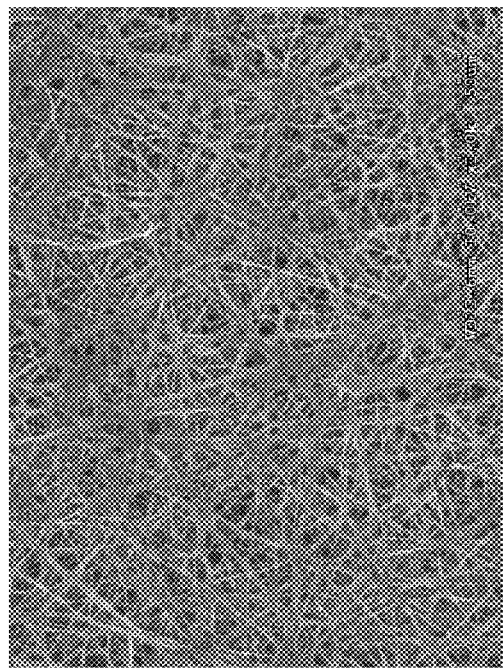
Figure 6:
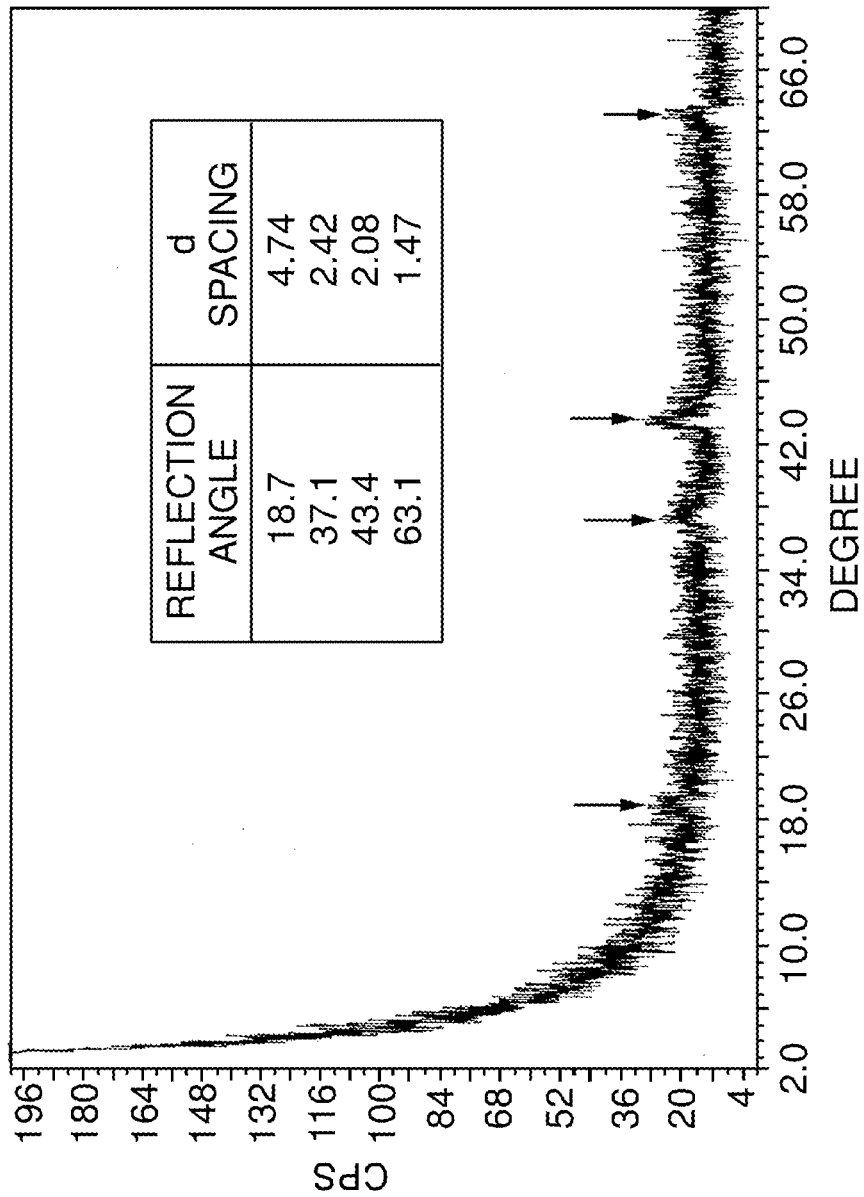
FIG. 6 shows an x-ray diffraction (XRD) of fibers after a heat treatment.

Fibers deposited by electrospinning can be subjected to a heat treatment (e.g., pyrolization) at temperatures of about 400° C. and about 800° C. Heat treatment can result in a crystalline material and provide better battery performance. FIGS. 5A-5B show SEM images of cathode fibers heat treated to 600° C. (5A—1,000 times magnification and 5B—2,000 times magnification). FIG. 6 shows an X-ray diffraction (XRD) analysis of the cathode fibers heat treated at 600° C. The relatively broad, weak peaks indicated by arrows represent the crystalline structure of the material.

Electrolyte Deposition

Figure 7:
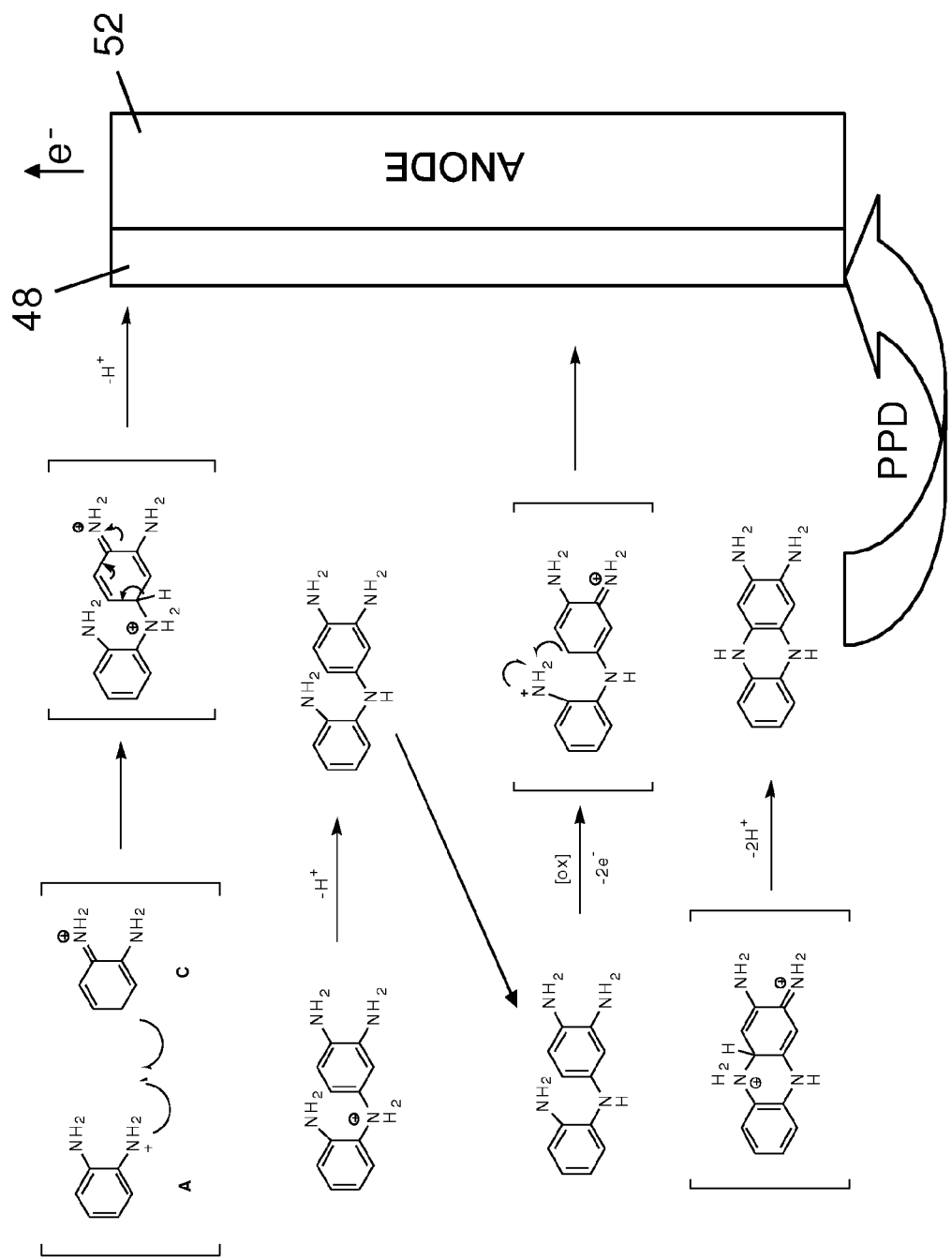
FIG. 7 is a schematic showing oxidative polymerization of poly(phenylenediamine) (PPD).

A suitable electrolytic polymer can be deposited over the cathode fibers. When the battery device is a lithium ion battery, the electrolytic polymer can be selected based on its electronic conductivity and/or its lithium conductivity. Typically, the corresponding monomer (e.g., phenylenediamine) can be mixed with a suitable solvent (e.g., lithium perchlorate). The solution can be added to a three electrode battery in which the cathode fibers can act as the working electrode. A platinum electrode can be used as the counter electrode and silver/silver chloride can be used as the reference electrode. The monomer can be oxidatively electropolymerized to form a substantially uniform film over the cathode fibers. FIG. 7 shows the polymerization chemistry that can occur at a charged surface in presence of a phenylenediamine monomer. In FIG. 7, a layer of poly(phenylenediamine) (PPD) polymer 48 on an anode surface 52. A deposition thickness of between about 5 nm and about 100 nm can be achieved by controlling the voltage applied across the electrodes, although thinner or thicker layers can be applied depending on the application.

FIGS. 8A-8B show SEM images of cathode fibers before and after electrodeposition of PPD. The deposition cycle can be alternated with a resting cycle to obtain a substantially uniform and complete coating of the cathode fibers. The resting cycle typically includes a residence time of several seconds at a suitable resting potential (e.g., 0.0 volts). The electrolyte deposition can include up to 400 cycles, and the thickness of the resulting electrolyte layer can be between about 5 nm and about 1000 nm, although thinner or thicker layers can be applied depending on the application. In FIG. 8, a first portion 56a, 56b of the fiber received a PPD coating of about 49 nm, a second portion 60a, 60b of the fiber received a PPD coating of about 198 nm, and a third portion 64a, 64b of the fiber received a PPD coating of about 85 nm.

Preparation of a Battery Device Containing a Fibrous Cathode

Anode Deposition

Figure 9B:
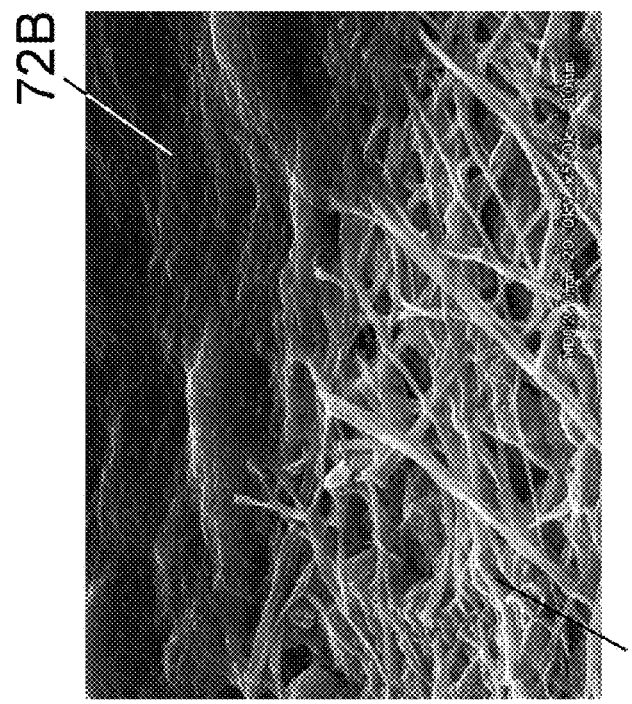
FIGS. 9A-9B shows SEM images of an anode material deposited on electrolyte coated cathode fibers.
Figure 9A:
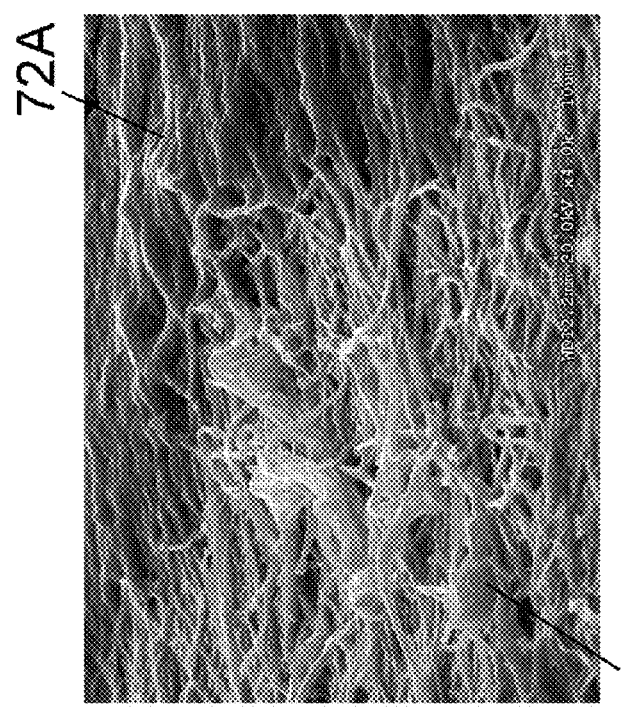

An anode material typically includes carbon (e.g., nanoparticulates of graphite). Commercially available plate-like graphite/carbon particles, e.g., graphite particles available from Structure Probe Inc. (West Chester, Pa.), can be used. The particles are mixed in a solvent (e.g., isopropanol). A solution of a polymeric binder (e.g., polyvinyl fluoride in dimethyl formamide) can be added to the anode material solution. The resulting solution/suspension can be added drop-wise to the electrolyte coated fibers. Capillary action can cause the fluid to infiltrate the pores in the fiber mesh evenly dispersing the anode material. The solvents can be removed by drying at elevated temperature and/or under vacuum. FIGS. 9A-9B show electrolyte coated cathode fibers partially encapsulated in the deposited anode material. Regions 68a, 68b are regions of uncoated fiber, and regions 72a, 72b are regions of coated fiber.

Anode Current Collector

An anode current collector can be formed from a metal (e.g., copper). In certain embodiments, the anode current collector is coated with an adhesion layer about 5 nm to about 20 nm in thickness. The anode current collector can be stacked over the deposited anode material. The cathode and anode current collectors can function as terminals of the battery device.

Preparation of a Battery Device Containing a Fibrous Anode

Similar techniques can be used to prepare a battery device in which the fibrous layer functions as the anode. For example, the fibrous anode can be prepared over a suitable strip that can act as the anode current collector. The fibrous anode can be an electrospun mesh of carbon fibers. The carbon fibers can be subjected to heat treatment such as, for example, pyrolysis. The fibrous anode can be substantially evenly coated with a suitable electrolytic layer. A plurality of particles including the cathode material can be dispersed over the mesh of carbon fibers coated with the electrolytic layer. Another strip can be used as the corresponding cathode current collector.

EXAMPLES

The following examples further illustrate the invention but should not be construed in any way as limiting its scope.

Figure 10:
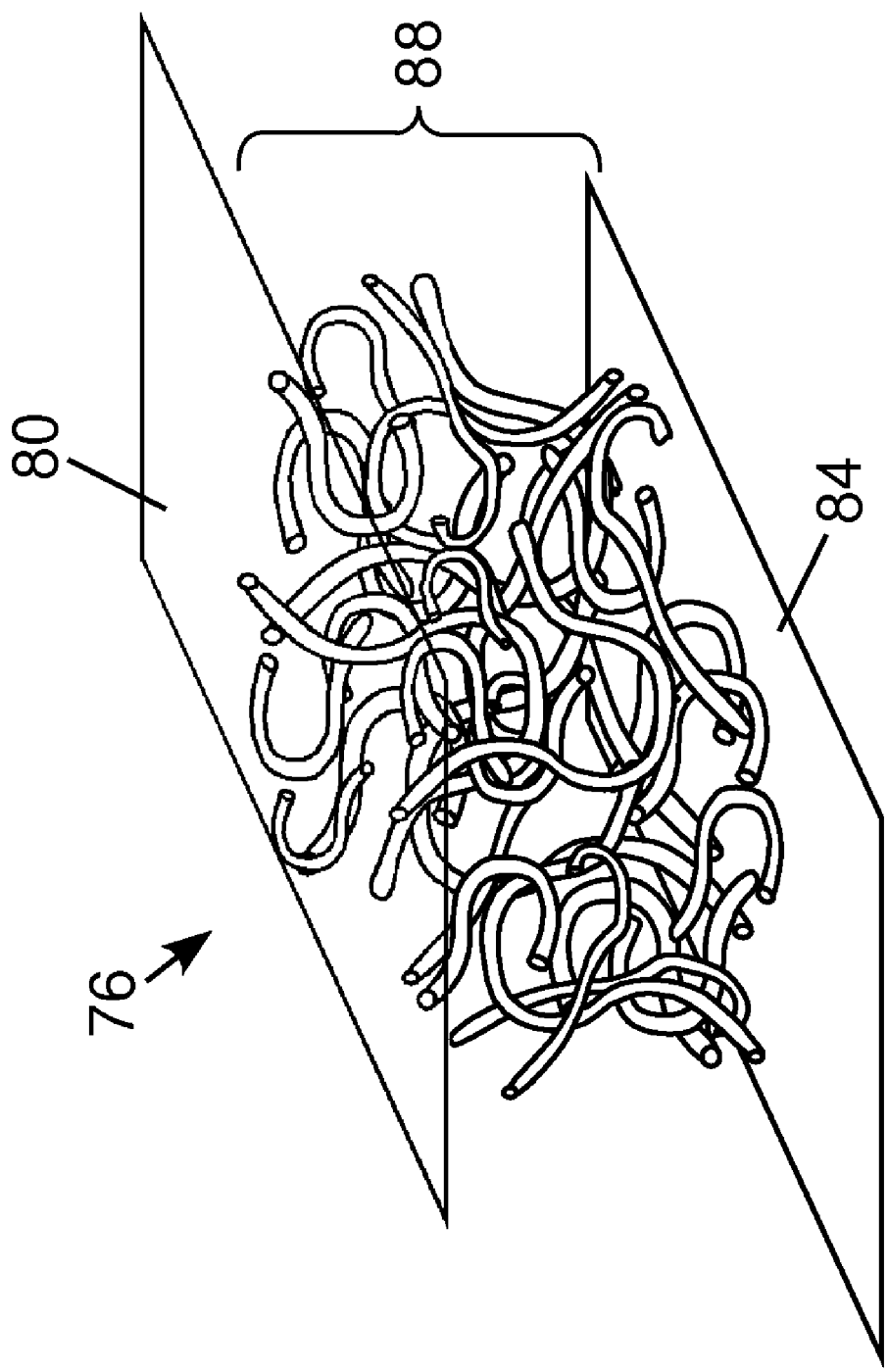
FIG. 10 shows a perspective view of a battery device.

FIG. 10 shows an embodiment of a three-dimensional battery device 76 including an anode current collector 80, a cathode current collector 84, and a network of fibers 88. The anode current collector 80 includes copper. The cathode current collector 84 includes nickel. The network of fibers 88 can be formed from $LiNi_{0.7}Co_{0.3}O_2$ fibers. The fibers can be deposited by electrospinning fibers on the cathode current collector 84. The sol-gel precursor solution can include metal acetates, poly(vinyl acetate) binder, and water. The network of fibers 88 can be heat treated at 600° C. to yield a continuous fiber network in direct contact with the cathode current collector 84. PPD can be added coat the fibers by electrochemical polymerization to form the separator/electrolyte. Graphite anode nanoparticles (not shown) can be infiltrated into pores defined in the fiber network 88. Contact can be made between the fiber network 88 and the anode current collector 80.

Figure 11:
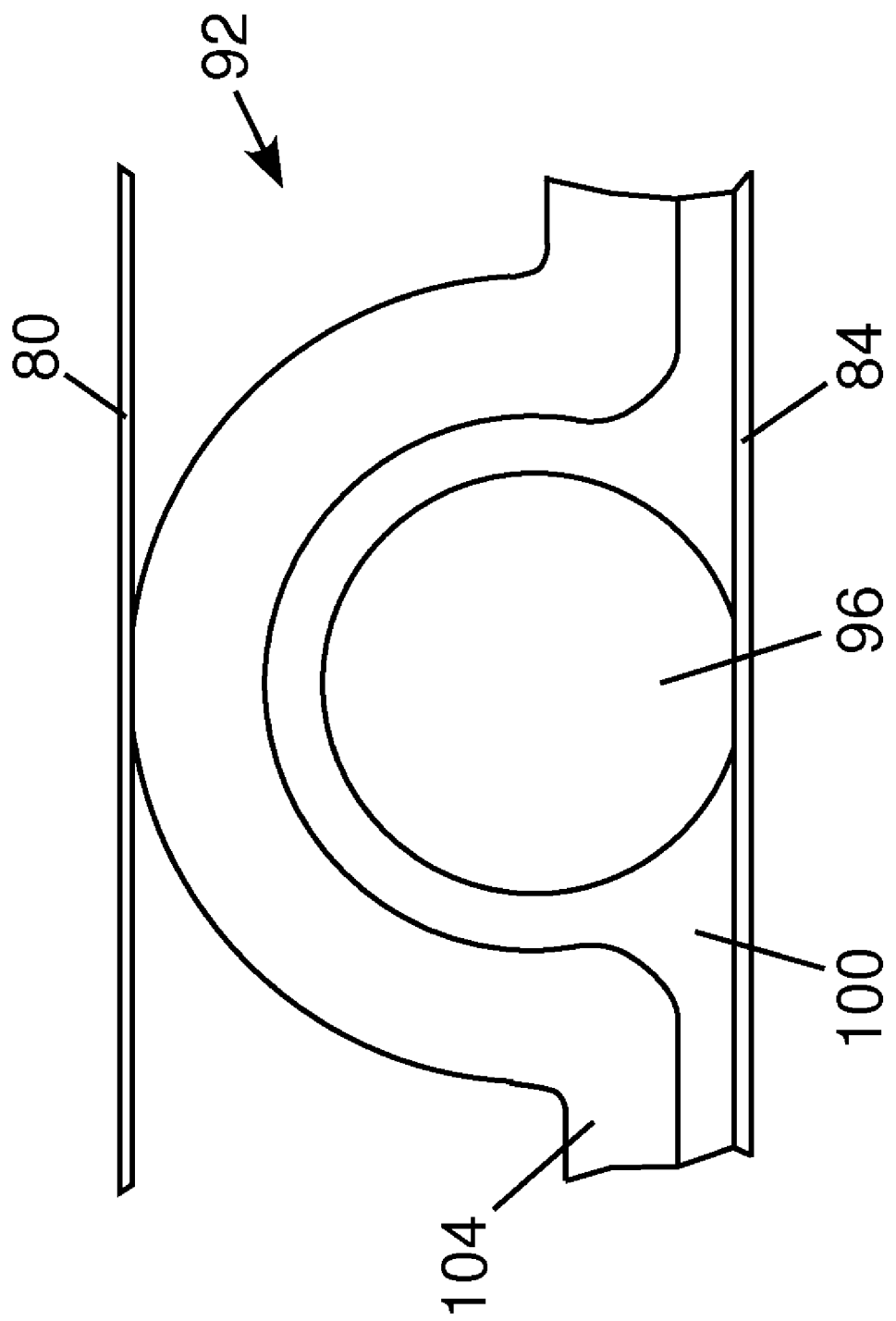
FIG. 11 shows a sectional view of a fiber.

FIG. 11 shows a sectional view of a fiber 92 of the network of fibers 88 shown in FIG. 10. The fiber 92 is in contact with the anode current collector 80 and the cathode current collector 84. The fiber 92 includes a core 96 and an electrolyte layer 100 deposited onto the cathode current collector 84. The fiber 92 can be a $LiCo_{0.3}Ni_{0.7}O_2$ nanofiner. The core can be between about 100 nm and about 500 nm. The electrolyte layer 100 can be solid and can include lithium ions. The electrolyte layer 100 can have a thickness of between about 10 nm and about 50 nm. A graphite anode material 104 is applied to the fiber 92 and can infiltrate pores defined in the fiber.

Cathode Fabrication

A $LiCo_{0.3}Ni_{0.7}O_2$ nanofiber can be prepared through a combination of sol-gel chemistry and a technique known as electrospinning. For example, aqueous solutions of the acetate or nitrate salts of lithium, nickel and cobalt were mixed in ratios that reflected the final fiber stoichiometry (1M Li, 0.7M Ni, 0.3M Co). To these solutions, candidate polymer carriers were incrementally added until the desired electrospinning characteristics were achieved.

Candidate polymers were chosen from those that were water soluble and were in a range of molecular weights (see, e.g., Table 1). Gel viscosity and total polymer content of the solution can be adjusted independently. Polymer solution viscosity is determined by concentration and polymer chain length. For example, a 0.1 M solution of 600,000 molecular weight PEO can have the same viscosity as a 0.05 M solution of 800,000 molecular weight PEO. This gave flexibility in maximizing the metal content of the solution while preserving electrospinning characteristics of the solutions.

The ratio of the salts in solution was kept constant while polymer content was varied relative to salt content between 2 and 40% by weight. All three polymers at two molecular weights were included in solutions and electrospinning was attempted. Poly(vinylpyrolidnone) had favorable electrospinning characteristics over a wide range of concentrations. The other acceptable choice was poly(vinyl acetate). Both the high and low molecular weights gave robust standing fibers. The 124 kD material was preferred because it was more readily dissolved. The final electrospinning solution formulation are included in Table 2.

Fibers were electrospun from the above solution formulation using the apparatus 20 shown in FIG. 3. The distance between the electrospinning tip and current collector target was maintained at 10 cm. Applied voltage between the tip and target was 15 kV. Electrospinning jet quality was monitored by real time video.

Cathode current collectors were cut from 25 mil nickel sheet in 1×3 cm strips. A 15 nm thick adhesion layer of the sol-gel precursor solution was applied to the current collector surface by spin coating. Two cm of the current collector surface was masked and electrospun fibers were deposited on the exposed portion to a thickness of approximately 200 μm.

Heat treatment to 600° C. gave fibers that were structurally sound and possessed the desired crystal structure. The X-ray diffraction analysis of the cathode fibers heat treated at 600° C. confirmed the crystal structure of the material. The relatively broad, weak peaks correspond to reference XRD spectra for $LiNi_{0.7}Co_{0.3}O_2$ and are characteristic of the nano-scale morphology of the sample and some degree of amorphous nature due to the relatively low heat treatment temperature.

PPD was electropolymerized in a growing solution containing 0.1 M lithium perchlorate and 0.01 M phenylenediamine in an aqueous borate buffer solution (pH=9). PPD films were grown on cathode fiber surfaces by using a potential step method. A typical 3 electrode cell was assembled with a 3D battery cathode as the working electrode, platinum mesh as the counter electrode and a silver/silver chloride reference electrode. PPD was grown by applying a 1.2 V potential for 5 seconds and 0.0 V for 15 s. The longer residence time at the resting potential (e.g., 0.0 V) insured the concentration of monomer at the fiber surface was replenished by diffusion prior to the subsequent application of deposition voltage. The deposition/rest cycle was applied 200 times to promote complete coverage of the fiber surface by PPD.

The anode material is a 5 weight percent homogeneous suspension of plate-like graphite/carbon particles in isopropanol manufactured by Structure Probe Inc (West Chester, N.Y.). To this suspension a polymeric binder, poly(vinylidiene fluoride) (PVDF), was added as a solution in dimethylformamide (DMF) to give a five weight percent solution of binder in anode material. This suspension was added drop wise to the electrolyte coated fibers. Capillary action caused the fluid to infiltrate the fiber mat evenly dispersing the anode material.

After application of the anode material, the batteries were dried at 100° C. to facilitate initial solvent removal from the anode. This was followed by additional drying at 120° C. under vacuum to remove the remaining DMF. Mass by difference indicated that the anode material was approximately 2.5 times the mass of the cathode fibers. Batteries were substantially completely coated with anode material.

Cathode Performance

Before assembly into full cells, the heat treated fibers were electrochemically tested in a traditional three electrode electrochemical cell. The single compartment cells were fitted with lithium metal reference and counter electrodes. Working electrodes were 1 cm² cathode fiber deposits on a nickel foil supports (exactly like the full cell samples) without PPD electrolyte or anode material. The electrolyte was 1.0M $LiPF_6$ in a 1:1 mixture of ethylene carbonate and dimethyl carbonate. Constant current charge and discharge cycles were run at very low rates (1 μA/cm²) to determine the inherent capabilities of the cathode material.

Figure 12:
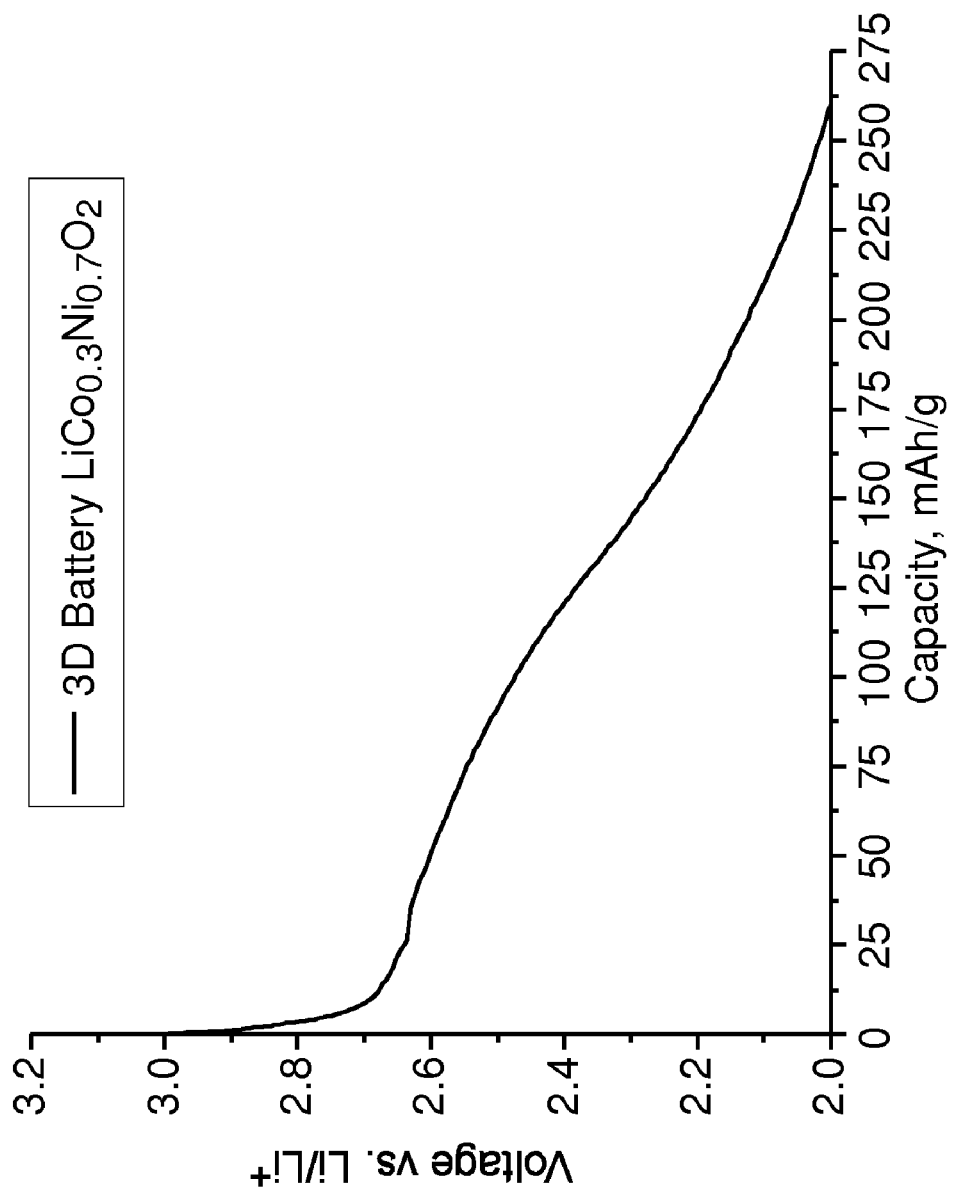
FIG. 12 shows discharge performance of a three-dimensional cathode.

FIG. 12 shows a discharge response of a typical cathode versus an oversized graphite counter electrode. Examination of the plot shows a relatively flat discharge averaging 2.8 V and near theoretical capacity (260 mAh/g) for the cathode material. The data also shows a voltage loss at the beginning of the discharge that is characteristic of a material that has a high internal resistance. The expected discharge voltage for $LiNi_{0.7}Co_{0.3}O_2$ is around 3.5 volts versus graphite. The reduced crystallinity and resistive nature of the small diameter conductors (the fibers themselves) may be responsible for the voltage loss in this system.

Anode Performance

The anode material was tested in the same manner as the cathode. The cell included a working electrode (the anode material) and lithium counter and reference electrodes. The working electrode included the nanoparticulate anode material and binder deposited as a thin film on a nickel foil substrate. The electrolyte was 1.0M $LiPF_6$ in a 1:1 mixture of ethylene carbonate and dimethyl carbonate. Constant current charge and discharge cycles were run at very low rates (1 µA/cm²) to determine the inherent capabilities of the anode material.

Figure 13:
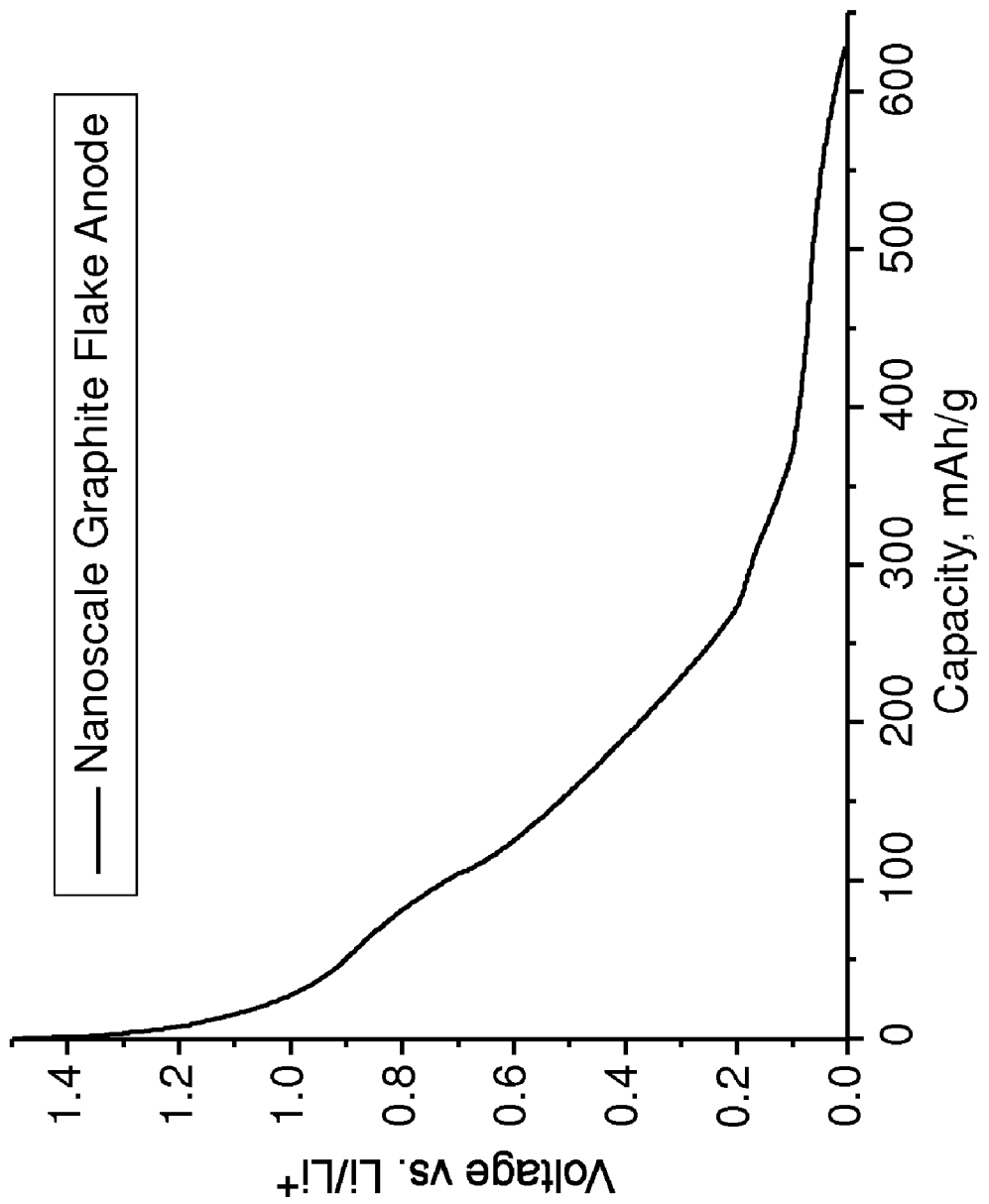
FIG. 13 shows discharge performance of a nanoparticulate graphite anode.

FIG. 13 shows discharge response of a typical anode material sample versus lithium counter electrode. The most noticeable feature is the exceptional capacity. At 600 mAh/g, it has almost twice the capacity of typical intercalation anodes. The desired anode behavior is a low discharge voltage over the capacity of the material. The sloping discharge curve describing the behavior of this anode material may play a role in reducing the measured cell voltage by reducing the ΔV between the anode and cathode.

Full Cell Performance

Batteries with Incomplete PPD Coverage

Figure 14:
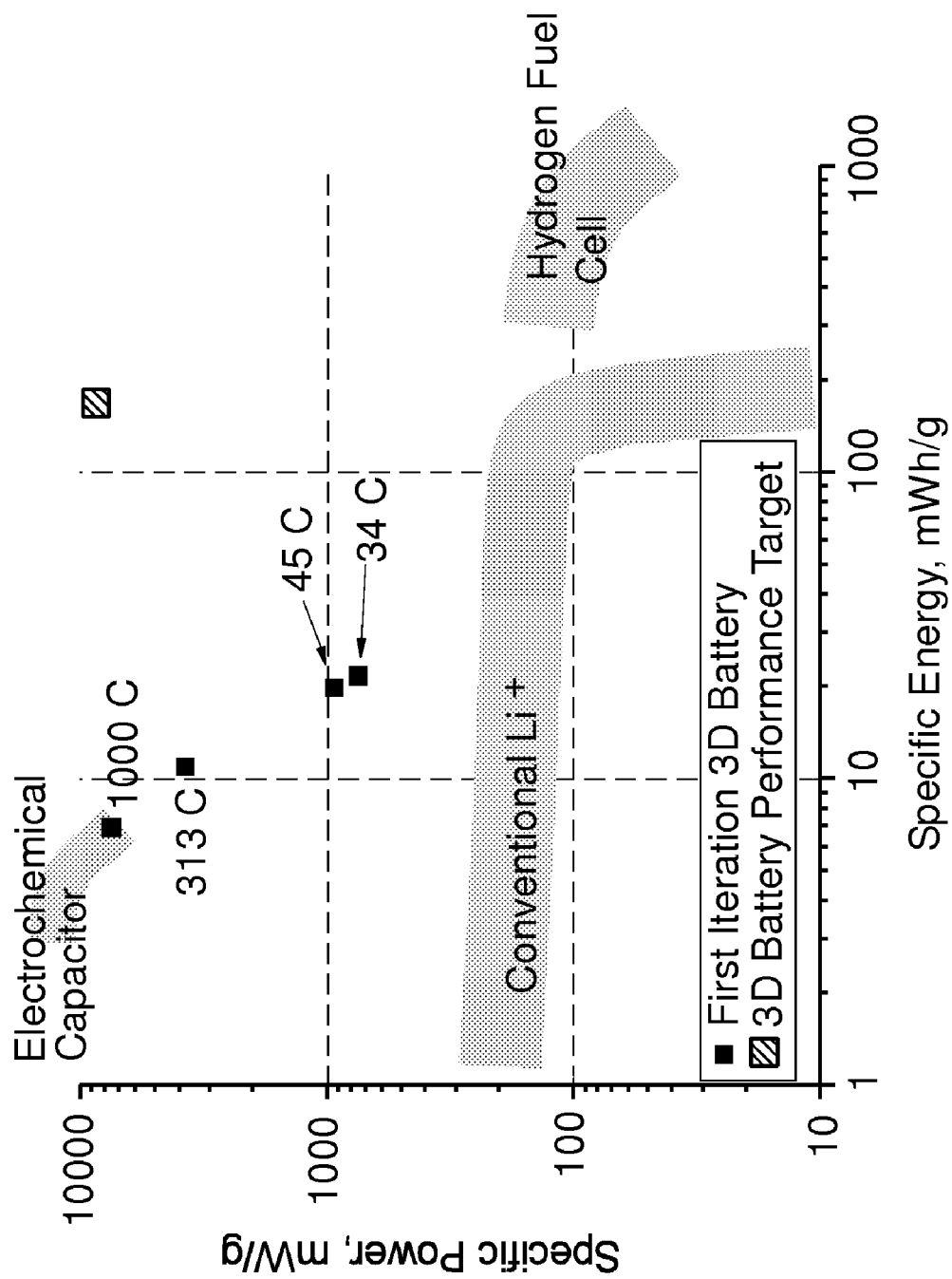
FIG. 14 is a Ragone plot showing the performance of a three-dimensional battery.

FIG. 14 shows a Ragone plot describing the performance of a first iteration of cells. Because the electrolyte layer was very thin, these cells were capable of very high discharge rates. FIG. 14 also shows that the specific power for these three-dimensional batteries approaches two orders of magnitude more than conventional lithium batteries.

The power capabilities are high probably because the electrolyte layer is very thin (e.g., about 50 nm or less). Mass by difference indicates a weight gain after deposition of the electrolyte. Calculations based on the diffusion rate of lithium ions through the PPD electrolyte (see, e.g., FIG. 15) suggest that an electrolyte can be less than 50 nm thick to sustain discharge rates higher than 100 C.

Batteries with Complete PPD Coverage

Figure 16:
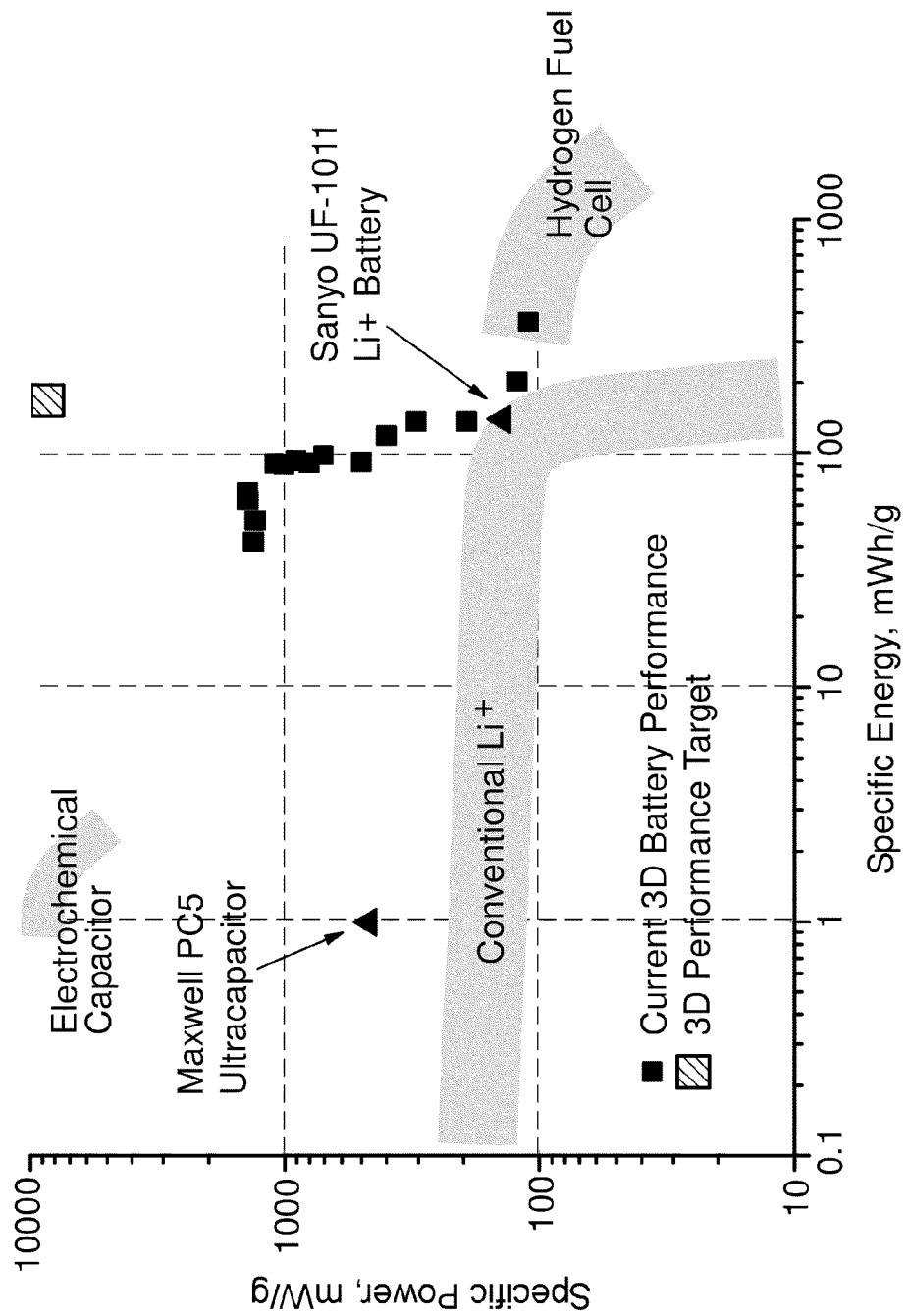
FIG. 16 is a Ragone plot showing the performance of a three-dimensional battery.

A second iteration of three-dimensional batteries was differentiated from the first by the electrolyte deposition protocol. These batteries had PPD deposited at 1.2 volts for 200 cycles resulting in electrolyte coverage that was complete. The average electrolyte thickness was 60 nm, but some areas measured over 120 nm in thickness. This extra thickness was achieved by soaking the batteries in liquid electrolyte prior to electrochemical testing to increase the lithium ion transport in the electrolyte. Soaking promoted absorption of the liquid into the PPD matrix promoting better ionic mobility. FIG. 16 is a Ragone plot of a three-dimensional battery and Table 3 show the performance of a three-dimensional battery.

TABLE 3

Battery Performance for a Three-dimensional Battery

| Cycle # | Specific Capacity mAh/g | Specific Energy mWh/g | Specific Power mW/g | Discharge "C" Rate |
|---|---|---|---|---|
| 1 | 147.28 | 368.2 | 110.46 | 0.3 |
| 2 | 81.52 | 203.8 | 122.28 | 0.6 |
| 3 | 55.04 | 137.6 | 192.64 | 1.4 |
| 4 | 55.08 | 137.7 | 302.94 | 2.2 |
| 5 | 48.2 | 120.5 | 397.65 | 3.3 |
| 6 | 36.88 | 92.2 | 497.88 | 5.4 |
| 7 | 39.64 | 99.1 | 703.61 | 7.1 |
| 8 | 36.52 | 91.3 | 803.44 | 8.8 |
| 9 | 37.56 | 93.9 | 901.44 | 9.6 |
| 10 | 36.2 | 90.5 | 1004.55 | 11.1 |
| 11 | 36.28 | 90.7 | 1097.47 | 12.1 |
| 12 | 27.6 | 69 | 1400.7 | 20.3 |
| 13 | 25.52 | 63.8 | 1397.22 | 21.9 |
| 14 | 20.84 | 52.1 | 1302.5 | 25 |
| 15 | 16.96 | 42.4 | 1318.64 | 31.1 |

Each data point in FIG. 16 represents the average of two cycles at increasing rates between C/3 and 50 C for one three-dimensional battery. Although cycle life was not specifically addressed, these data suggest the three-dimensional system has some tolerance for repeated charge and discharge cycling. Some noticeable features in the plot are the rate independent capacity retention and high power capability. The tails at both the low and high rate ends of the data correspond to voltage losses and diffusion limitations, respectively.

The bulk of the data falls between 100 and 1000 mW/g representing a span of discharge rates between 1 C and 35 C. In contrast to conventional lithium ion batteries (see, e.g., FIG. 17), which steadily loose energy at rates above 5 C, a three-dimensional battery retains energy until diffusion limited transport dominates the system. At this point (the turn in the curve to lower energy at high rate on the Ragone plot), the three-dimensional system behaves similarly to all diffusion based electrochemical power storage devices. These data represent a revolutionary improvement in rechargeable lithium ion battery performance.

The alternate electrochemical power storages devices show a limit to the power capabilities that is marked by a transition from a vertical trend on the Ragone plot to a horizontal trend. This bend in the Ragone plot describes the diffusion limited transport of charge carriers (e.g., $Li^+$ for batteries, $H^+$ for fuel cells) in the system. In the three-dimensional battery system, the diffusion limit is defined by the portion of the battery that displays the lowest rate of $Li^+$ transport, the electrolyte. The bend in the Ragone plot in the high power region is a direct result of the electrolyte and its thickness.

Figure 15:
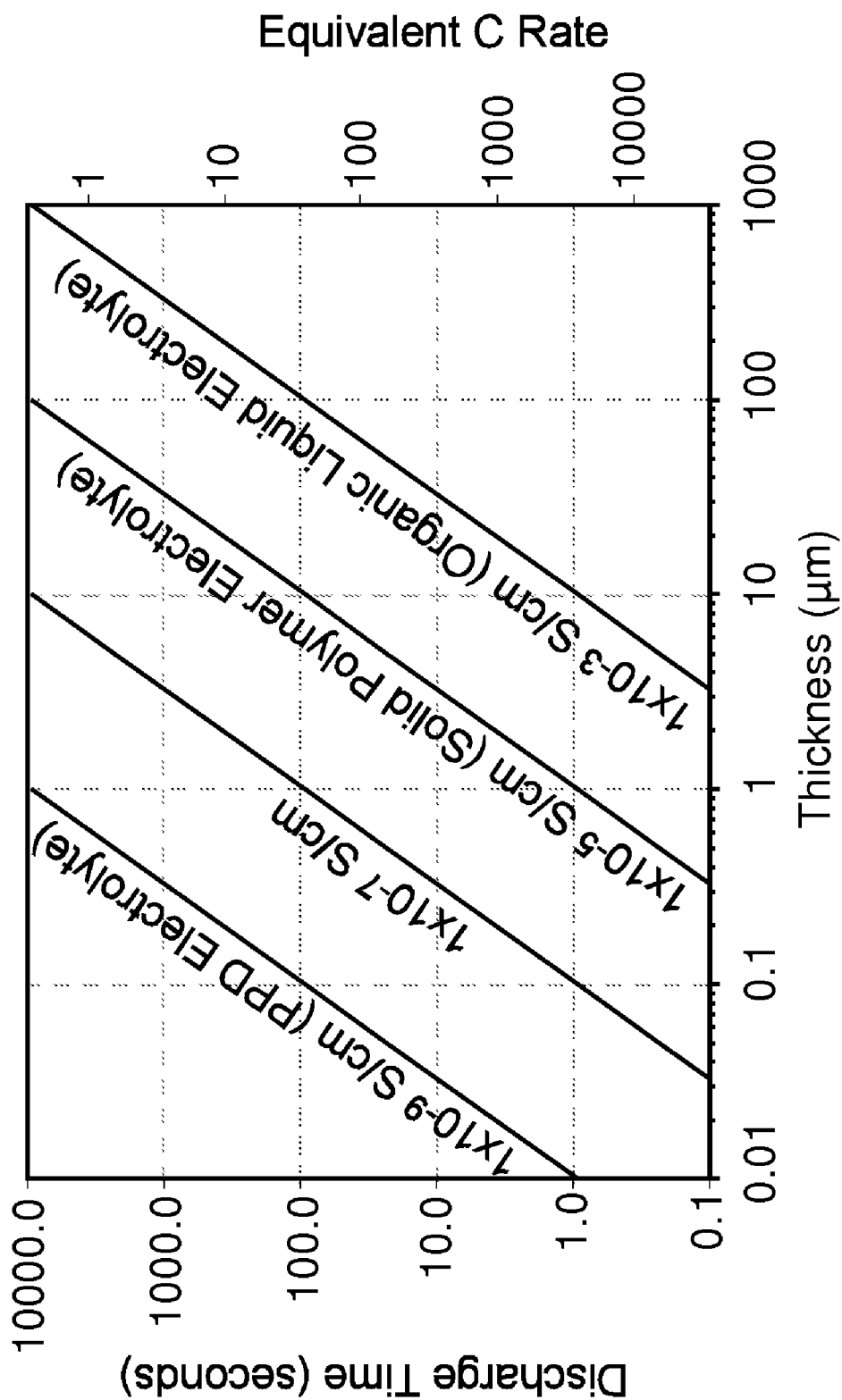
FIG. 15 shows the relationship between discharge rate and electrolyte thickness for several electrolyte systems.

Referring to the data of FIG. 15 describing the three-dimensional battery PPD electrolyte, a 50 nm electrolyte thickness can be used to achieve discharge rates of 50 C (which can be used, e.g., to reach the specific power goal). At 60 nm (the average thickness of the current electrolyte), the rate capability is limited to 30 C. This limit is reflected in the data of FIG. 16.

Cathode Conductivity

Figure 17:
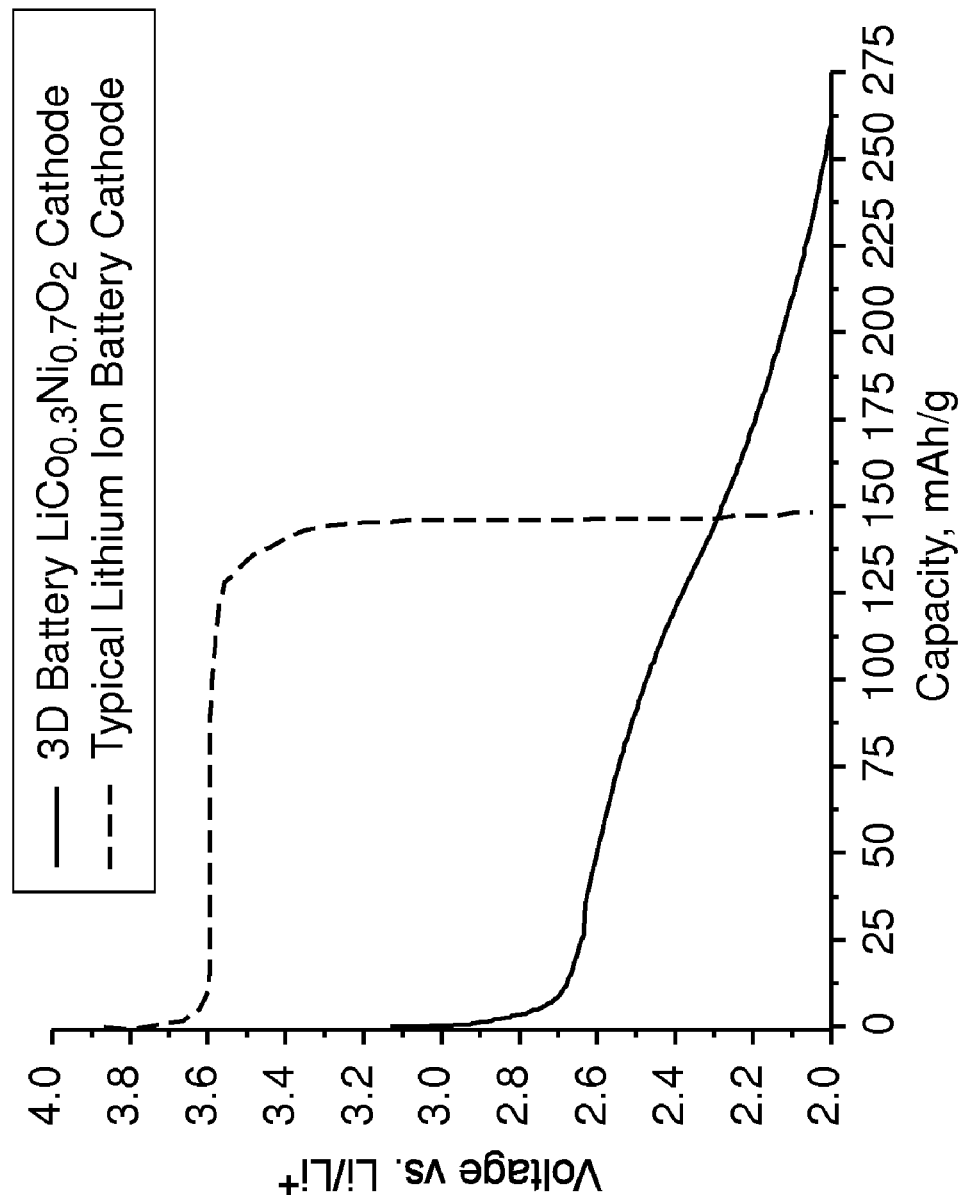
FIG. 17 shows discharge performance of a three-dimensional battery cathode.

FIG. 17 shows the voltage characteristics of a three-dimensional cathode material over its discharge range and compares it to the response for a typical $Li^+$ cathode material. While the measured capacity for the three-dimensional cathode is near theoretical, one feature is the large voltage loss associated with the initial application of current. In contrast, the trace for the typical cathode shows a much smaller initial voltage loss. This may be because of formulating up to 15% (the theoretical percolation threshold) conducting carbon into the cathode mixture. The conductivity of the cathode fibers can be increased by causing the inclusion of conducting carbon within the fibers themselves.

Scaling is perceived as an important feature of a three-dimensional battery. The ability to generate relatively large currents at stable single cell potentials above two volts with volumes less than a cubic centimeter make it especially applicable to small scale distributed devices requiring burst power such as autonomous sensors and robotics. For example, a DARPA/MTO conceptualized autonomous robotic moth requires 40 mW to run actuators for flight.

A three-dimensional battery can have an average discharge potential of 2.5 V requiring a current of 16 mA to satisfy the 40 mW requirement. Based on the maximum gravimetric current allowed by a three-dimensional battery system, the mass of a battery that can generate 16 mA of current, and subsequently the volume, can be 40 mg and 0.027 cm³. Conventional lithium ion batteries are not appropriate because engineering constraints prohibit effective micro-scaling. For this (and potentially many other) size constrained applications, the three-dimensional battery has an advantage.

In concert with a high capacity, low power supply like Radio Isotope Micropower Sources (RIMS) or micro-fuel cells generating off-peak and recharge power, such autonomous devices can have unattended run times measured in years. This becomes especially attractive for covertly monitoring hostile battle space where servicing autonomous devices comes at too high a personnel risk. The unique attributes of high power and small scaling are especially suited to autonomous robotics and sensor devices.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A battery device comprising:
   a cathode current collector defining a first surface of the battery device;
   a fibrous cathode forming a structure defining a plurality of pores, a first portion of the fibrous cathode being in contact with the cathode current collector;
   polymer electrodeposited on the fibrous cathode to provide substantial uniform coverage of fibers forming the fibrous cathode, wherein the polymer is an electrolyte;
   a plurality of anode particles disposed within the plurality of pores and separated from the fibrous cathode by the polymer; and
   an anode current collector defining a second surface of the battery device.

2. The battery device of claim 1 wherein the fibrous cathode is an electrospun mesh of ceramic fibers.

3. The battery device of claim 2 wherein the ceramic fibers have a thickness between about 50 nanometers and 1,000 nanometers.

4. The battery device of claim 1 wherein the fibrous cathode exhibits substantial fiber to fiber contact to provide an electrically unified mesh.

5. The battery device of claim 1 wherein the battery is a lithium based battery device.

6. The battery device of claim 1 wherein the fibrous cathode is formed of $LiNi_{0.7}Co_{0.3}O_2$ fibers.

7. The battery device of claim 1 wherein the plurality of anode particles comprise carbon nanoparticles.

8. The battery device of claim 1 wherein the polymer comprises poly(phenylenediamine).

9. The battery device of claim 8 wherein the poly(phenylenediamine) is exposed to a liquid electrolyte solution after electrodeposition.

10. The battery device of claim 1 wherein the fibers forming the fibrous cathode are coated with about 5 nanometers to about 100 nanometers of the polymer.

11. A battery device comprising:
    an anode current collector defining a first surface of the battery device;
    a fibrous anode forming a structure defining a plurality of pores, a first portion of the fibrous anode being in contact with the anode current collector;
    polymer electrodeposited on the fibrous anode to provide substantial uniform coverage of fibers forming the fibrous anode, wherein the polymer is an electrolyte;
    cathode particulates disposed within the plurality of pores and separated from the fibrous anode by the polymer; and
    a cathode current collector defining a second surface of the battery device.

12. The battery device of claim 11 wherein the fibrous anode is an electrospun mesh of fibers.

13. The battery device of claim 12 wherein the fibers have a thickness between about 50 nanometers and 1,000 nanometers.

14. The battery device of claim 11 wherein the fibrous anode exhibits substantial fiber to fiber contact to provide an electrically unified mesh.

15. The battery device of claim 11 wherein the battery is a lithium based battery device.

16. The battery device of claim 11 wherein the fibrous anode is formed of pyrolyzed electrospun carbon fibers.

17. The battery device of claim 11 wherein the cathode particulates comprise ceramic nanoparticles.

18. The battery device of claim 11 wherein the cathode particulates comprise ceramic particulates formed within the plurality of pores through sol-gel techniques.

19. The battery device of claim 11 wherein the polymer comprises poly(phenylenediamine).

20. The battery device of claim 19 wherein the poly(phenylenediamine) is exposed to a liquid electrolyte solution after electrodeposition.

21. The battery device of claim 11 wherein the fibers forming the fibrous anode are coated with about 5 nanometers to about 100 nanometers of the polymer.

22. A method of forming a battery structure, the method comprising:
    applying an adhesive to a first current collector;
    electrospinning fibers onto the adhesive to form a mesh having fused fibers and a plurality of pores;
    electrodepositing a polymer onto the mesh to provide a coating on the exterior surface of the fused fibers; and
    infiltrating electrode particulates into the plurality of pores, the coating on the exterior surface of the fused fibers preventing direct contact between the electrode particulates and the fused fibers.

23. The method of claim 22 wherein a second current collector is attached to an opposing side of the battery structure from the first current collector.

24. The method of claim 22 wherein electrospinning fibers comprises electrospinning carbon fibers followed by pyrolyzing the carbon fibers to form the mesh having fused fibers and a plurality of pores.

25. The method of claim 24 wherein rigid supports are positioned above and below the carbon fibers during pyrolyzation.

26. The method of claim 24 wherein pyrolyzation occurs at a temperature between about 500° C. and 2500° C.

27. The method of claim 22 further comprising electrodepositing the polymer from a solution with a monomer concentration ranging between about 0.1 mM and about 1.0 M.

28. The method of claim 27 further comprising applying a pulsed voltage across the mesh to electrodeposit the polymer.

29. The method of claim 22 wherein electrospinning fibers comprises electrospinning precursors for ceramic fibers followed by pyrolyzing the precursor fibers to yield ceramic fibers forming the mesh.

30. The method of claim 29 further comprising wherein pyrolyzing the ceramic fibers at a temperature of between about 500° C. and 2500° C.

31. The method of claim 22 wherein infiltrating electrode particulates into the plurality of pores comprises applying a solution including the electrode particulates to the mesh.

32. The method of claim 31 wherein the electrode particulates comprise nano-sized particles of electrode material.

33. The method of claim 22 wherein infiltrating electrode particulates into the plurality of pores comprises applying a solution including constituents to form the electrode particulates to the mesh and reacting the solution to form the electrode particulates within the plurality of pores.

34. The method of claim 23 further comprising immersing the battery structure into a liquid electrolyte solution.

* * * * *